(12) United States Patent
Humburg

(10) Patent No.: US 11,040,597 B2
(45) Date of Patent: Jun. 22, 2021

(54) HEAT EXCHANGER UNIT

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 152 days.

(21) Appl. No.: 16/169,047

(22) Filed: Oct. 24, 2018

(65) Prior Publication Data
US 2019/0118617 A1    Apr. 25, 2019

(30) Foreign Application Priority Data
Oct. 25, 2017    (DE) ...................... 10 2017 124 912.5

(51) Int. Cl.
*B60H 1/22*    (2006.01)
*F28F 27/02*    (2006.01)
*F28D 7/12*    (2006.01)

(52) U.S. Cl.
CPC ............. *B60H 1/2209* (2013.01); *F28D 7/12* (2013.01); *F28F 27/02* (2013.01); *B60H 2001/2246* (2013.01); *B60H 2001/2256* (2013.01); *B60H 2001/2271* (2013.01); *B60H 2001/2278* (2013.01)

(58) Field of Classification Search
USPC ................................................... 237/12.3 C
See application file for complete search history.

(56) References Cited

U.S. PATENT DOCUMENTS 6,431,459 B1 * 8/2002 Humburg ............. B60H 1/2209
                                                      237/2 A
9,395,101 B2 * 7/2016 Lesage .................. F24H 9/2021
(Continued)

FOREIGN PATENT DOCUMENTS

DE    38 39 244 A1    9/1989
DE    39 42 732 A1    6/1991
(Continued)

OTHER PUBLICATIONS

"DE_3942732_A1_M—Machine Translation.pdf", machine translation, EPO.org, May 9, 2020.*

*Primary Examiner* — Daniel E. Namay
(74) *Attorney, Agent, or Firm* — McGlew and Tuttle, P.C.

(57) ABSTRACT

A heat exchanger unit, especially for a fuel-operated vehicle heater, with a heat exchanger housing (16) with an outer wall (24) and with an inner wall (30), wherein the outer wall (24) and the inner wall (30) define a heat carrier medium flow space (36), through which heat carrier medium (M) can flow, wherein at least one sensor mounting opening (42) is formed in the outer wall (24) and a sensor (40) is received in the at least one sensor mounting opening (42) in a fluid-tight manner and displaceably and protruding into the heat carrier medium flow space (36) with an area (50) protruding into the flow space and supported on the inner wall, wherein a prestressing element (52) acting on the sensor (40) for supporting it at the inner wall (30) is associated with the sensor (40), wherein the prestressing element (52) is fixed in a fixing area (54) in relation to an outer housing (58) enclosing the heat exchanger unit (22) in at least some areas and it acts on the sensor (40) in an action area (56) for support at the inner wall (30).

17 Claims, 2 Drawing Sheets

(56) References Cited

U.S. PATENT DOCUMENTS

| | | | | |
|---|---|---|---|---|
| 2002/0046831 A1* | 4/2002 | Humburg | ............. | B60H 1/2209 |
| | | | | 165/202 |
| 2012/0037096 A1* | 2/2012 | Watanabe | ................ | F23L 11/02 |
| | | | | 122/14.21 |
| 2015/0362215 A1* | 12/2015 | Lesage | .................... | F16B 2/245 |
| | | | | 248/213.2 |
| 2017/0115032 A1* | 4/2017 | Rodriguez | ............ | F24H 9/2007 |

FOREIGN PATENT DOCUMENTS

| | | |
|---|---|---|
| DE | 101 55 844 A1 | 6/2002 |
| DE | 101 44 612 A1 | 3/2003 |
| DE | 102016005392 B3 | 6/2017 |
| JP | S61-003020 U | 1/1986 |
| WO | 91/09749 A1 | 7/1991 |

* cited by examiner

HEAT EXCHANGER UNIT

CROSS REFERENCE TO RELATED APPLICATIONS

This application claims the benefit of priority under 35 U.S.C. § 119 of German Application 10 2017 124 912.5, filed Oct. 25, 2017, the entire contents of which are incorporated herein by reference.

TECHNICAL FIELD

The present invention pertains to a heat exchanger unit, for example, for a fuel-operated vehicle heater.

BACKGROUND

A heat exchanger unit comprises, especially in so-called water heaters, a heat exchanger housing having an essentially pot-shaped structure, for example, with two pot-shaped housing parts placed one into the other. An inner of these two housing parts forms an inner wall with an inner circumferential wall and with an inner bottom wall. An outer of these two housing parts forms an outer wall with an outer circumferential wall and with an outer bottom wall. A heat transfer medium flow space, through which a heat transfer medium, i.e., for example, water, can flow, is defined between the inner wall and the outer wall.

To provide information on the thermal state of the heat transfer medium, on the one hand, and of the heat exchanger unit and hence of a vehicle heater equipped therewith, on the other hand, a sensor, for example, a temperature sensor, may be arranged in the outer housing such that it passes through a sensor mounting opening. Such a sensor may be positioned with an area protruding into the flow space such that it protrudes into the heat carrier medium flow space in order to thermally interact there with the heat transfer medium that is present or flowing there. Further, the sensor can be positioned such that it is supported at the inner wall with the area protruding into the flow space, in order to come in this manner into direct thermal interaction with the inner wall and to be also able to provide information representing the thermal state of the inner wall.

SUMMARY OF THE INVENTION

An object of the present invention is to provide a heat exchanger unit, for example, for a fuel-operated vehicle heater, which makes possible in a simple yet reliable manner the correct positioning of a sensor positioned such that it protrudes into a heat transfer medium flow space.

This object is accomplished according to the present invention by a heat exchanger unit, especially for a fuel-operated vehicle heater, comprising a heat exchanger housing with an outer wall and with an inner wall, wherein the outer wall and the inner wall define a heat transfer medium flow space, through which a heat transfer medium can flow, wherein at least one sensor mounting opening is formed in the outer wall and a sensor is mounted in the at least one sensor mounting opening in a fluid-tight manner and displaceably and protruding into the heat transfer medium flow space with an area protruding into the flow space and supported on the inner wall, wherein a prestressing element, which acts on the sensor for being supported at the inner wall, is associated with the sensor, wherein said prestressing element is fixed in a fixing area in relation to an outer housing surrounding the heat exchanger unit in at least some sections and acts on the sensor in an action area for support on the inner wall.

In the heat exchanger unit configured according to the present invention, the prestressing element is carried basically on the outer housing, so that when the outer housing is mounted on the heat exchanger unit or on a heater having the latter, the prestressing element is brought into interaction with the sensor to be acted on by said prestressing element and no additional mounting actions or mounting procedures need to be performed in order to make it possible to bring or hold the sensor in interaction with the prestressing element.

Provisions may be made in an especially preferred embodiment for the prestressing element to be supported in its action area in relation to the sensor and for a prestressing element abutment area to be provided at the outer housing opposite the sensor mounting opening. The prestressing element can thus be supported at the sensor, on the one hand, and at the outer housing, on the other hand, so that substantial forces of reaction stressing the fixing area based on the action on the sensor are avoided.

To make it possible to check with the outer housing mounted whether a prestressing element is provided and is arranged in the correct position, it is proposed that an opening be provided in the prestressing element abutment area of the outer housing.

For a prestressing interaction that can be achieved in a simple yet reliable manner, the prestressing element may have a U-shaped configuration in the area in which it is acted on and be supported with a first U-leg in relation to the prestressing element abutment area and supported with a second U-leg in relation to the sensor.

To avoid overturning moments in the area of the area in which the prestressing element acts during the support in relation to the outer housing, it is proposed that an abutment surface that is essentially at right angles to a central longitudinal axis of the sensor or/and to the sensor mounting opening receiving this sensor be provided for supporting the area in which the prestressing element acts.

To fix the prestressing element in relation to the outer housing, the outer housing may have a fixing projection, which projects in the direction of the outer wall and protrudes into a fixing opening of the fixing area.

Separation of the prestressing element from the fixing projection can be prevented here in a simple manner if a plurality of protruding projections acting on an outer circumferential surface of the fixing projection are provided at the inner circumference of the fixing opening.

To deform the protruding projections in a simple manner when the fixing area is pushed over the fixing projection and to bring them in the process into a position in which they act on the outer circumferential surface of the fixing projection under prestress, the fixing projection may be configured such that it tapers, preferably conically, in the direction of the outer wall.

In an alternative embodiment for fixing the prestressing element on the outer housing, it is proposed that the fixing opening have a keyhole-like shape and that the fixing projection have a projection head overlapping a narrow area of the fixing opening.

To prevent rotation of the prestressing element about the fixing projection, an anti-rotation formation holding the prestressing element against rotation about the fixing projection, preferably with at least one anti-rotation projection projecting in the direction of the outer wall, may be provided on the outer housing.

The prestressing element may have a leaf spring-like configuration in an embodiment that is simple, but nevertheless stable and is not compromised by changing ambient thermal conditions. The fixing area may be provided in one end area of the prestressing element and the action area in another end area of the prestressing element. The outer housing may be made of a plastic material. The sensor may be a temperature sensor.

The present invention further pertains to a fuel-operated vehicle heater, comprising a burner area and a heat exchanger unit configured according to the present invention.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
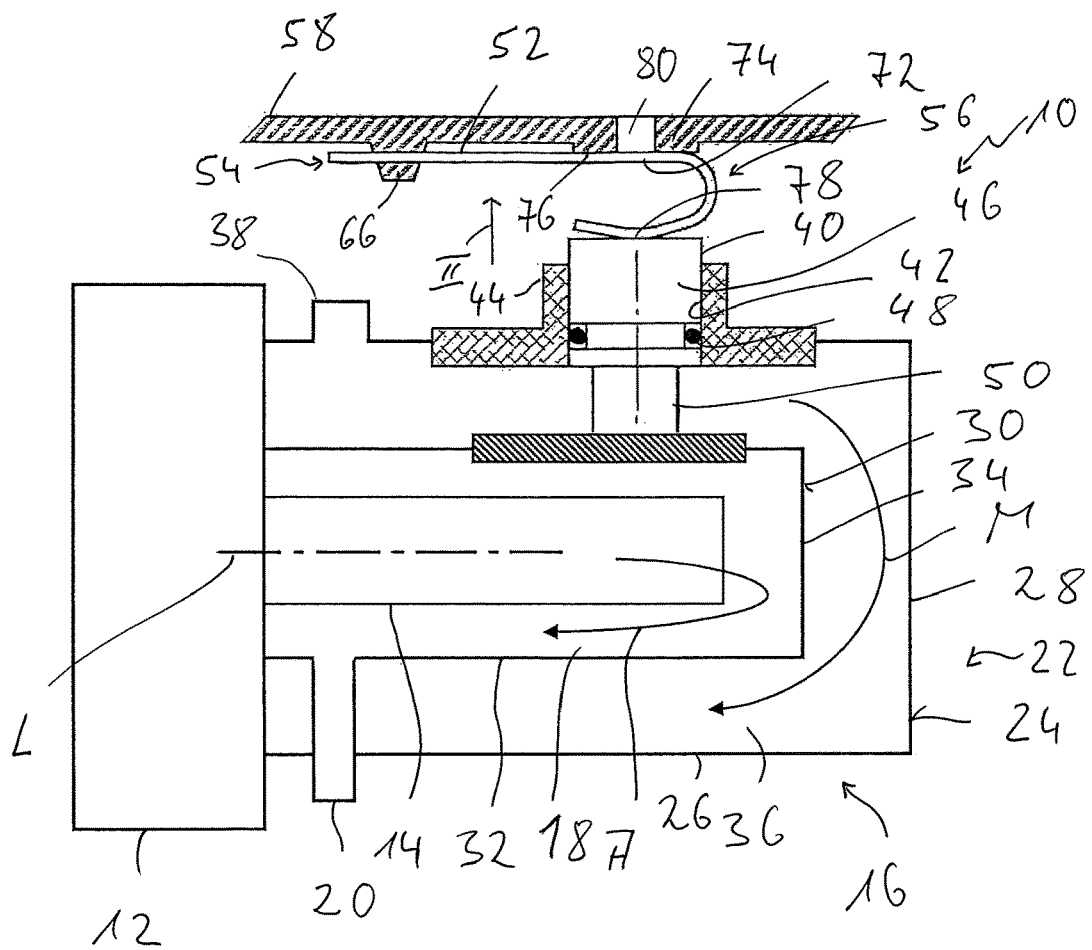
FIG. 1 is a schematic partially sectional view of a fuel-operated vehicle heater.

Referring to the drawings, a fuel-operated vehicle heater is generally designated by 10 in FIG. 1. The vehicle heater 10 comprises a burner with a burner area 12, to which fuel and combustion air can be fed. The waste gas A formed during the combustion of a mixture formed from the fuel and the combustion air flows from a combustion chamber of the burner area 12 through a flame tube 14 and leaves this at the axial end area thereof located at a distance from the burner area 12. After deflection at a heat exchanger housing 16, the waste gas A flows along a waste gas flow space 18 formed between the heat exchanger housing 16 and the flame tube 14 back to a waste gas outlet 20.

The heat exchanger housing 16 of a heat exchanger unit generally designated by 22 comprises an outer wall 24 with an outer circumferential wall 26 and with an outer bottom wall 28. The heat exchanger housing 16 further comprises an inner wall 30 with an inner circumferential wall 32 and with an inner bottom wall 34. The outer wall 24, configured with a pot-shaped structure, thus defines, together with the inner wall 30, likewise having a pot-shaped structure, a heat transfer medium flow space 36. A liquid heat transfer medium M, e.g., for example, water, can enter the heat transfer medium flow space 36 via a heat transfer medium inlet 38, flow through this flow space and absorb heat in the process by thermal interaction with the inner wall 30, and it can leave the heat transfer medium flow space 36 at a heat transfer medium outlet, not shown in FIG. 1, which may be positioned in the same axial end area of the heat exchanger housing 16 as the heat transfer medium inlet 38.

The inner wall 30, which is subject to high thermal load, is made of a metallic material, for example, aluminum, in the heat exchanger housing 16 configured with a pot-shaped structure. The outer wall 24, which is subject to thermal load to a lesser extent, is advantageously made of a plastic material because of a lower weight and for cost reasons and is connected to the inner wall 30, for example, by bonding in order to achieve a fluid-tight closure of the heat transfer medium flow space 36.

To provide information on the temperature of the heat transfer medium M or/and of the inner wall 30, a temperature sensor, which is generally designated by 40, is provided. The temperature sensor 40 is received in a sensor mounting opening 42 in the outer circumferential wall 26 of the outer wall 24. The outer circumferential wall 26 may have for this purpose, for example, an outwardly projecting sensor connection piece 44. The sensor 40 is mounted with a carrying area (46) displaceably in the direction of a central longitudinal axis L of the sensor 40 or sensor mounting opening 42. A sealing element 48, surrounding the carrying area 46 in a ring-shaped manner, for example, an O-ring made of a rubber material, provides a fluid-tight closure between the carrying area 46 and the outer circumferential wall 26, on the one hand, and the sensor connection piece 44, on the other hand.

With an area 50 with which it protrudes into the heat carrier medium flow space 36, the sensor 40 extends through the heat carrier medium flow space 36 and is supported in the direction of the central longitudinal axis L on the outer side of the inner circumferential wall 32 of the inner wall 30. The sensor 40 is in thermal interaction in this manner with the inner wall 30 and can provide information representing the temperature thereof. The sensor 40 can thus operate especially as an overheating sensor and it can be inferred from the information provided by the sensor 40 whether the risk of overheating of the inner wall 30 is present.

Figure 3:
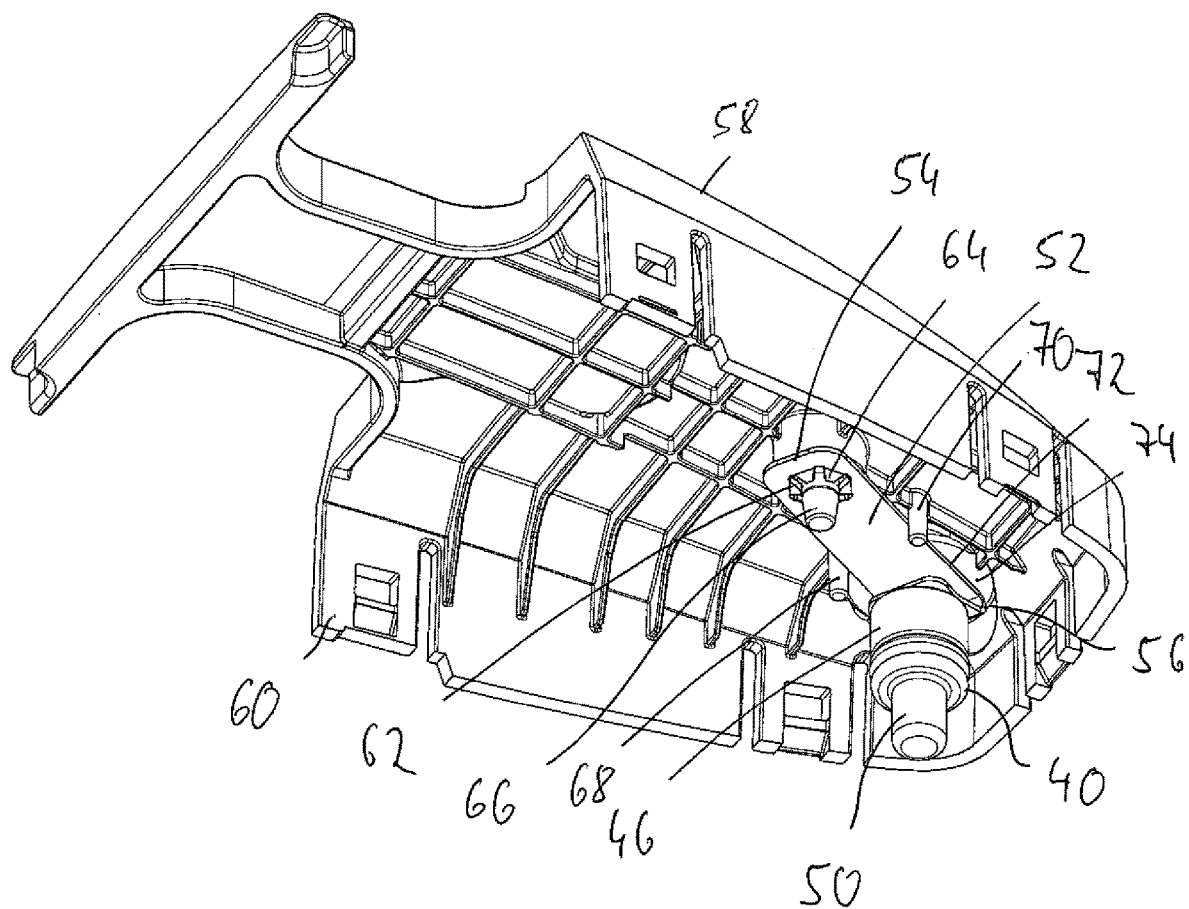
FIG. 3 is a perspective view of an outer housing provided in the vehicle heater according to FIG. 1.

A prestressing element generally designated by 52 is provided to hold the sensor 40 in its position in which it is supported on the inner wall 30. The prestressing element 52 is made, for example, in the manner of a leaf spring from sheet metal or spring steel or the like and has a fixing area 54 as well as an action area 56. The prestressing element 52 is fixed with prestressing element fixing area 54 at an outer housing 58, which can be seen in FIG. 3. The outer housing 58 is preferably molded from a plastic material and can be fixed by a plurality of locking tongues 60 on the vehicle heater 10, especially in the area of the heat exchanger unit 22, covering the latter in some areas.

Figure 2:
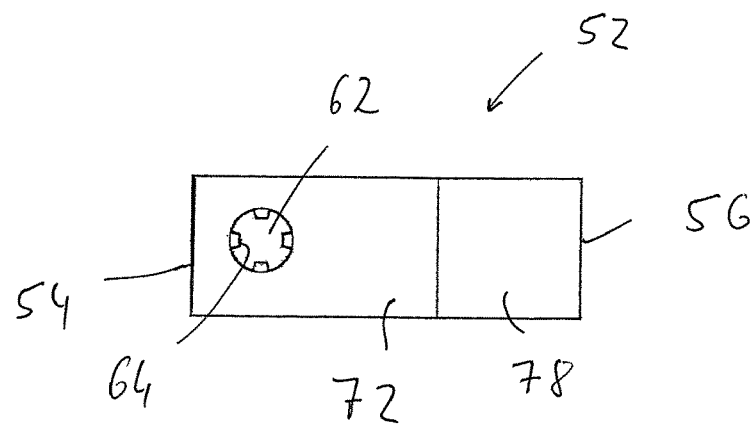
FIG. 2 is a view of a prestressing element used in the vehicle heater according to FIG. 1 in the viewing direction II in FIG. 1.

The prestressing element 52 shown in FIG. 2 has a fixing opening 62 in its fixing area 54. A plurality of protruding projections 64 project inwardly on the inner circumference of the fixing opening. Associated with the fixing opening 62, a fixing projection 66, which tapers, for example, conically, is provided on the outer housing 58. The prestressing element 52 is pushed with its fixing opening 62 over the fixing projection 66. The protruding projections 64 are slightly deformed in the process against the push-over direction and thus act on the outer surface of the fixing projection 66 under prestress. Since the outer housing 58 is made of a plastic material, the protruding projections 64 forming an integral part of the prestressing element 52 can dig into the material of the fixing projection 66 and thus they ensure stable fixation of the prestressing element 52 on the outer housing 58. To prevent rotation of the prestressing element 52 about the fixing projection 66 and thus to predefine a defined positioning at the outer housing 58, anti-rotation projections 68, 70, which are positioned on both sides of the prestressing element 52 if the latter is positioned correctly and thus prevent rotation or pivoting of the prestressing element 52, may be provided in association with the prestressing element 52 at a spaced location from the fixing projection 66.

The prestressing element 52 has a U-shaped configuration in its action area. With a first U-leg 72, which also provides in its extension the fixing area 54, the prestressing element 52 is supported at a prestressing element abutment area 74 formed on the outer housing 58. The prestressing element abutment area 74 provides an abutment surface 76, which is essentially at right angles to the central longitudinal axis L of the temperature sensor 40 and of the sensor mounting opening 42 and with which the first U-leg 72, which has an essentially flat, i.e., non-curved configuration in this area, is flatly in contact.

With its second U-leg 78, the prestressing element 52 acts on the carrying area 46 of the sensor 40. The second U-leg 78 may be arched convexly in the direction of the carrying area 46, so that this acts on the carrying area 46 in the central area thereof in an acting direction directed essentially in the direction of the longitudinal axis L. The area in which the second U-leg 78 acts on the carrying area 46 of the sensor 40 is located opposite the prestressing element abutment area 74, so that essentially no torque develops at the prestressing element 52 when the action area 56 is supported on the outer housing 58, and the fixing area 54 is thus not subject essentially to the action of any force developing because of the prestress of the sensor 40.

To make it possible to check when the outer housing 58 is mounted on the vehicle heater 10 that a prestressing element 52 is provided and is in the correct position, an opening 80, through which the prestressing element 52 can be observed visually, may be formed on the outer housing 58 in the area of the prestressing element abutment area 74.

Figure 4:
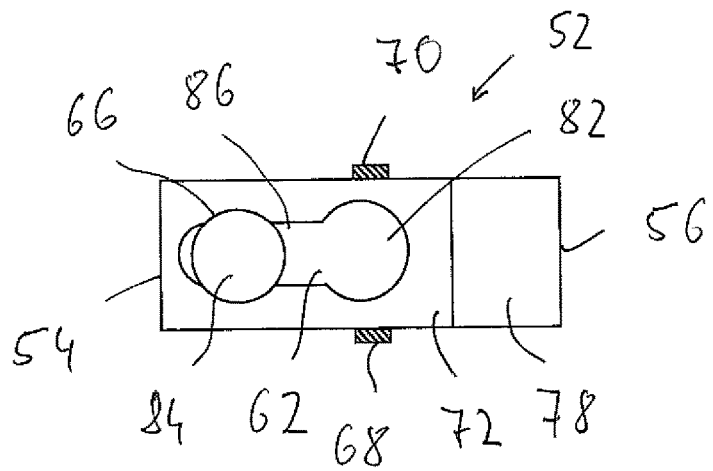
FIG. 4 is a view corresponding to FIG. 2 of an alternative embodiment of a prestressing element.

An alternative embodiment of the prestressing element 52 is shown in FIG. 4. In the type of configuration shown in FIG. 4, the fixing opening 62 has a keyhole shape. The fixing projection 66 of the outer housing 58 has a mushroom shape or an undercut area. A broad area 82 of the fixing opening 62 is dimensioned such that a projection head 84 of the fixing projection 66 can be inserted through this into the fixing opening 62. If this has been done, the prestressing element 52 can be displaced in its longitudinal direction, so that the fixing projection 66 enters the narrow area 86 of the fixing opening 62 and thus extends behind the prestressing element 52 with its projection head 84. The anti-rotation projections 68, 70 provided on the outer housing ensure, in turn, a defined positioning and prevent rotation of the prestressing element 52 about the fixing projection 66. To also guarantee locking in the longitudinal direction of the prestressing element 52, the groove-like undercut formed on the fixing projection 66 may be dimensioned, for example, such that when the fixing projection 66 enters the narrow area 86, the projection head 84 clamps the fixing area 54 of the prestressing element 52.

It becomes possible with the embodiment according to the present invention of a prestressing element 52 to avoid a load on the area, in which this prestressing element 52 is fixed in relation to the outer housing 58, on the one hand, and to guarantee a defined positioning of the sensor 40, on the other hand. Following a heat-induced expansion or deformation of the inner wall 30, the sensor 40 thus can move in the sensor mounting opening 42, because the outer wall 24 is subject, in general, to a lower heat load and thus also to a lower heat-induced change in shape. This is especially important because the sensor 40 is, in general, in thermal interaction with the inner wall 30 in the area in which this inner wall is subject to an especially high heat load. This is the area in which the inner circumferential wall 32 adjoins the inner bottom wall 34, i.e., the area of the inner circumferential wall 32 in which the comparatively hot waste gas leaves the flame tube 14 and reaches the inner surface of the inner wall 30.

While specific embodiments of the invention have been shown and described in detail to illustrate the application of the principles of the invention, it will be understood that the invention may be embodied otherwise without departing from such principles.

What is claimed is:

1. A heat exchanger unit, for a fuel-operated vehicle heater, the heat exchanger unit comprising:
    a heat exchanger housing comprising an outer wall and an inner wall, wherein the outer wall and the inner wall define a heat carrier medium flow space, through which heat carrier medium can flow, wherein at least one sensor mounting opening is formed in the outer wall;
    a sensor received in the at least one sensor mounting opening in a fluid-tight and displaceable manner and supported at the inner wall and having a heat carrier area flow space protruding area, protruding into the heat carrier medium flow space; and
    a prestressing element acting on the sensor in an action area, for support of the sensor at the inner wall, wherein the prestressing element is fixed in a fixing area in relation to an outer housing surrounding the heat exchanger unit in at least some areas, the prestressing element being supported in the action area in relation to the sensor, a prestressing element abutment area being provided at the outer housing located opposite the sensor mounting opening, the prestressing element having a leaf spring-like configuration, the fixing area being provided in an end area of the prestressing element and the action area being provided in another end area of the prestressing element, the prestressing element having a U-shaped configuration in the action area, the prestressing element being supported with a first U-leg in relation to the prestressing element abutment area and being supported with a second U-leg in relation to the sensor.

2. The heat exchanger unit in accordance with claim 1, wherein an opening is provided in the prestressing element abutment area of the outer housing.

3. The heat exchanger unit in accordance with claim 1, wherein an abutment surface that is essentially at right angles to a central longitudinal axis of the sensor or to the sensor mounting opening receiving same or that is essentially at right angles to a central longitudinal axis of the sensor and to the sensor mounting opening receiving same, is provided in the prestressing element abutment area for supporting the action area of the prestressing element.

4. The heat exchanger unit in accordance with claim 1, wherein the outer housing has a fixing projection, which projects in a direction of the outer wall and protrudes into a fixing opening of the fixing area.

5. The heat exchanger unit in accordance with claim 4, wherein a plurality of protruding projections acting on an outer circumferential wall of the fixing projection are provided on the inner circumference of the fixing opening.

6. The heat exchanger unit in accordance with claim 5, wherein the fixing projection has a preferably conically tapering configuration in a direction of the outer wall.

7. The heat exchanger unit in accordance with claim 4, wherein the fixing opening has a keyhole shape and the fixing projection has a projection head overlapping a narrow area of the fixing opening.

8. The heat exchanger unit in accordance with claim 4, further comprising an anti-rotation formation, which holds the prestressing element against rotation about the fixing projection, the anti-rotation formation being provided at the outer housing and comprising at least one anti-rotation projection protruding in a direction of the outer wall.

9. The heat exchanger unit in accordance with claim 1, wherein:
the outer housing is made of a plastic material; and
the sensor is a temperature sensor.

10. A fuel-operated vehicle heater comprising:
a burner with a burner area; and
a heat exchanger unit comprising:
a heat exchanger housing comprising an outer wall and an inner wall, wherein the outer wall and the inner wall define a heat carrier medium flow space, through which heat carrier medium can flow, wherein at least one sensor mounting opening is formed in the outer wall;
a sensor received in the at least one sensor mounting opening in a fluid-tight and displaceable manner and supported at the inner wall and having a heat carrier area flow space protruding area, protruding into the heat carrier medium flow space; and
a prestressing element acting on the sensor in an action area, for support of the sensor at the inner wall, wherein the prestressing element is fixed in a fixing area in relation to an outer housing surrounding the heat exchanger unit in at least some areas, the prestressing element being supported in the action area in relation to the sensor, a prestressing element abutment area being provided at the outer housing located opposite the sensor mounting opening, the prestressing element having a leaf spring-like configuration, the fixing area being provided in an end area of the prestressing element and the action area being provided in another end area of the prestressing element, the prestressing element having a U-shaped configuration in the action area, the prestressing element being supported with a first U-leg in relation to the prestressing element abutment area and being supported with a second U-leg in relation to the sensor.

11. The fuel-operated vehicle heater in accordance with claim 10, wherein an opening is provided in the prestressing element abutment area of the outer housing.

12. The fuel-operated vehicle heater in accordance with claim 10, wherein an abutment surface that is essentially at right angles to a central longitudinal axis of the sensor or to the sensor mounting opening receiving same or that is essentially at right angles to a central longitudinal axis of the sensor and to the sensor mounting opening receiving same, is provided in the prestressing element abutment area for supporting the action area of the prestressing element.

13. The fuel-operated vehicle heater in accordance with claim 10, wherein:
the outer housing has a fixing projection, which projects in a direction of the outer wall and protrudes into a fixing opening of the fixing area; and
a plurality of protruding projections acting on an outer circumferential wall of the fixing projection are provided on the inner circumference of the fixing opening.

14. The fuel-operated vehicle heater in accordance with claim 13, wherein the fixing opening has a keyhole shape and the fixing projection has a projection head overlapping a narrow area of the fixing opening.

15. The fuel-operated vehicle heater in accordance with claim 13, wherein the heat exchanger unit further comprises an anti-rotation formation, which holds the prestressing element against rotation about the fixing projection, the anti-rotation formation being provided at the outer housing and comprising at least one anti-rotation projection protruding in a direction of the outer wall.

16. The fuel-operated vehicle heater in accordance with claim 10, wherein:
the outer housing is made of a plastic material; and
the sensor is a temperature sensor.

17. A heat exchanger unit comprising:
a heat exchanger housing comprising an outer wall and an inner wall spaced from said outer wall, said outer wall and said inner wall being configured to define a flow space through which heat carrier medium can flow, said outer wall defining a sensor opening;
an outer housing at least partially surrounding, and spaced from, said heat exchanger housing, said outer housing having an abutment area arranged opposite said sensor opening;
a sensor movably arranged in sensor opening and in contact with said inner wall, said sensor having a portion arranged in said flow space;
a prestressing element mounted on said outer housing, said prestressing element having a fixing area arranged at one end area of said prestressing element, said prestressing element having an action area at another end area of said prestressing element, said fixing area being configured to fix said prestressing element to said outer housing, said action area being configured to bias said sensor directly away from said abutment area and into contact with said inner wall, said action area having a U-shaped configuration, said action area having a first U-leg in contact with said abutment area and biased against said abutment area, said action area having a second U-leg in contact with said sensor and biased against said sensor, said abutment area being directly across and opposite said sensor opening, said fixing area being fixed to said outer housing at a position spaced from said abutment area.

* * * * *